June 8, 1965 E. F. STAVER 3,187,812
HEAT DISSIPATOR FOR ELECTRONIC CIRCUITRY
Filed Feb. 11, 1963 2 Sheets-Sheet 1

INVENTOR.
EDWARD F. STAVER
BY James and Franklin
ATTORNEYS

HEAT DISSIPATOR FOR ELECTRONIC CIRCUITRY

Filed Feb. 11, 1963

2 Sheets-Sheet 2

INVENTOR.
EDWARD F. STAVER

BY James and Franklin

ATTORNEYS

United States Patent Office 3,187,812

Patented June 8, 1965

3,187,812
HEAT DISSIPATOR FOR ELECTRONIC CIRCUITRY

Edward F. Staver, Brightwaters, N.Y., assignor to The Staver Company Incorporated, Bay Shore, N.Y., a corporation of New York Filed Feb. 11, 1963, Ser. No. 257,481
6 Claims. (Cl. 165—185)

This invention relates to heat dissipators, especially for use in electronic circuitry, and more particularly for use with semiconductors.

Semiconductor devices are being used at an ever increasing rate. One of the problems to be solved is the dissipation of heat generated by such devices. Heat sinks have been employed, but to achieve thermal stability the present heat sinks are so large and heavy that they offset the space and weight advantages gained by the use of semiconductors.

The primary object of the present invention is to generally improve heat dissipators. More particular objects are to provide heat dissipators which are light in weight, compact in dimension, low in cost, and which make use of conduction, convection, and radiation for increased heat dissipation. Another object is to provide heat dissipator units which may be mounted back to back, or nested in crossed relation, or both, to meet the needs of the user. A further object is to provide a heat dissipator which is modular or so fabricated that it may be made in different dimensions at minimum expense, in order to meet the varying needs of different purchasers.

To accomplish the foregoing general objects, and other more specific objects which hereinafter appear, my invention resides in the heat dissipator elements and their relation one to another, as are hereinafter more particularly described in the following specification. The specification is accompanied by drawings in which.

Figure 1:
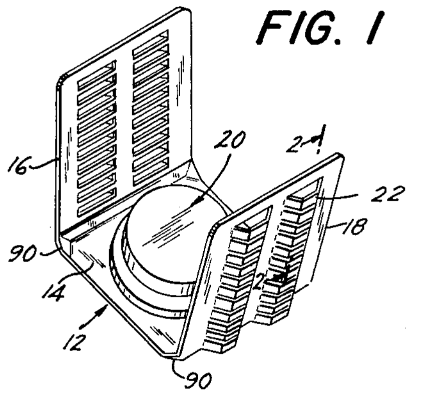
FIG. 1 is a perspective view showing a heat dissipator unit embodying features of my invention.

Referring to the drawing, and more particularly to

Figure 4:
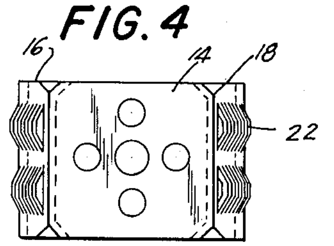
FIG. 4 is a bottom view.

FIGS. 1–4, the heat dissipator there shown comprises a stamped sheet metal unit generally designated 12. It has a base 14 and wings 16 and 18 bent upward from opposite sides of the base 14. The base has holes for the passage of the terminals of a semiconductor device 20. The holes are hidden in FIG. 1, but are shown in FIG. 4. The wings 16 and 18 are nearly perpendicular to the base and have parallel strips 22 excised and displaced outwardly for increased heat dissipation. The wings 16 and 18 are preferably divergent at a small angle at each side, rather than truly perpendicular.

Considering the device in greater detail, the base 14 is preferably square, and the wings are preferably rectangular and have substantially the same width as the base. The material is preferably sheet aluminum which is anodized black. However, it may be copper, and it may be coated with black paint having a dull or matte finish. An important advantage of anodizing is that the coating then is a good heat conductor and an electrical insulator, both of which are desirable for the present purpose.

Figure 5:
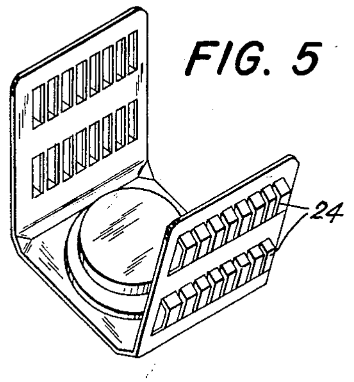
FIG. 5 is a view similar to FIG. 1, but showing a modification.

FIG. 5 shows a heat dissipator much like that shown in FIG. 1, but differing in having excised strips 24 which run vertically, whereas in FIGS. 1–4 they extend horizontally. This terminology is relative, it being understood that one advantage of the present dissipator is that it may be mounted vertically or horizontally or inverted or at any desired angle.

Figure 2:
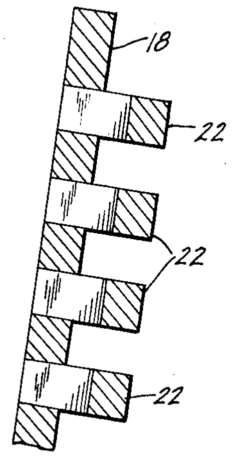
FIG. 2 is a fragmentary section drawn to enlarged scale and taken on the line 2—2 of FIG. 1.
Figure 3:
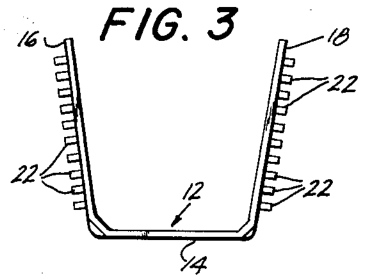
FIG. 3 is an end view.

The displaced strips 22 and 24 are not exactly louvres, because they are excised from the main body of metal at both top and bottom edges of the strip, as will be clear from inspection of FIG. 2, but for convenience the strips sometimes may be referred to as louvres. A true louvre may be used but is difficult to make unless the metal is thin. In either case there are strips which are excised and displaced for increased heat dissipation. The selection of the direction of these louvres, as between FIG. 1 and FIG. 5, is largely dependent on the preference of the user. The heat dissipation provided by one form is susbtantially the same as that provided by the other, and any slight difference which may be found under careful test conditions will depend on the direction of air circulation in the particular piece of equipment in which the dissipator is being used.

Although the device is not limited to particular dimensions, in some preferred examples now being made the base is 1.20 inches by 1.20 inches. The wings have a height of 1 inch or 1½ inches or 2 inches, depending on the heat dissipation requirement. The angle of divergence of the wings is ten degrees on each side. The sheet metal has a thickness of 0.030 inch, but the same units are also available in a thickness of 0.060 inch.

Figure 6:
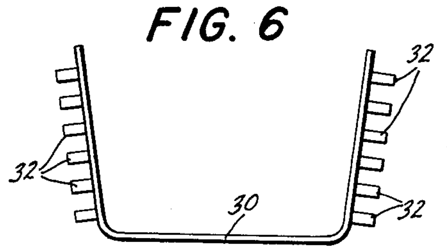
FIG. 6 is an end view like FIG. 3, but showing another form of the invention.
Figure 7:
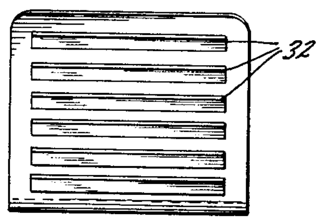
FIG. 7 is a side elevation of the dissipator shown in FIG. 6.

A variant form of the dissipator, intended for lighter duty, is shown in FIGS. 6 and 7 of the drawing. This dissipator is smaller and is made of lighter sheet metal, but has been drawn to larger scale in FIGS. 6 and 7. In one manufactured size the base 30 is 1.00 inch by 1.00 inch, and the metal has a thickness of 0.020 inch, or optionally when so requested, may be made of metal having a thickness of 0.040 inch. The excised and displaced strips or louvres 32 are of full length, there being a single set of long louvres instead of the two sets of short louvres shown in FIGS. 1 and 5.

Heat dissipators in the dimensions described above would be used for low to medium power transistors, for example, those commercially designated TO–3 or TO–36.

It will be understood that the quantitative dimensions given above are intended solely by way of example, and are not to be considered in limitation of the invention.

Figure 8:
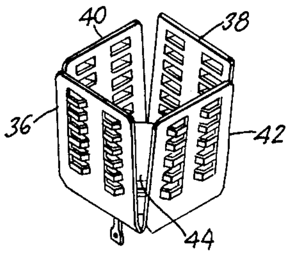
FIG. 8 is a perspective view showing how two units may be nested in crossed relation.
Figure 9:
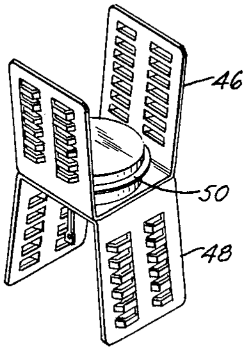
FIG. 9 shows two units disposed back to back.

Referring now to FIG. 8, one advantage of the present dissipator is that for increased load, two such dissipators may be nested in crossed relation. In the present case the wings 36 and 38 form part of one dissipator unit, and the wings 40 and 42 are part of another dissipator unit. Each has its own base, and the two bases are superposed beneath the semiconductor device, which in this case is a power transistor 44. The bases and the holes therethrough register, so that the assembly is easily made. The units also may be disposed in back to back relation as shown in FIG. 9. In this case a dissipator unit 46 is arranged back to back with another dissipator unit 48, with both aiding heat dissipation from a power transistor 50. In FIG. 9 the units are crossed, but of course may be disposed back to back, with the wings one above the other, as suggested in FIG. 14.

Figure 10:
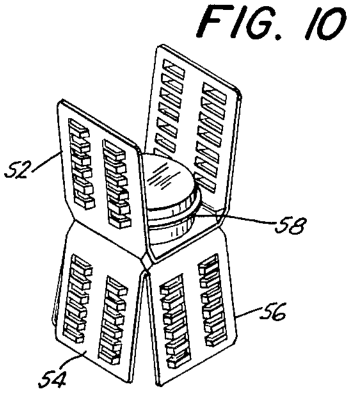
FIG. 10 shows three units which are both nested and back to back.

This also is illustrated by a part of FIG. 10 in which dissipator unit 52 is back to back with dissipator unit 54, without crossing the units. However, in FIG. 10 there is an additional unit 56 which is inverted and crossed relative to the units 52 and 54. In FIG. 10 the power transistor 58 is being used with three dissipator units, and it will be understood, without illustration, that the third unit may have its wings extending upward instead of downward, and further, that four such units may be employed instead of three, with two extending upward and two extending downward. In other words, two of the crossed pairs shown in FIG. 8 may be used back to back.

Figure 16:
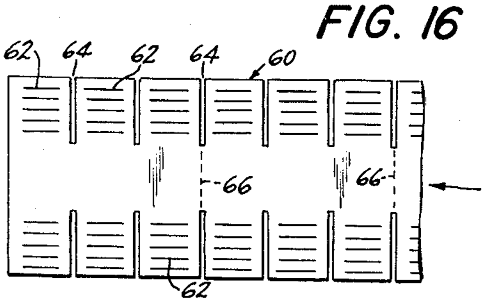
FIG. 16 is explanatory of the method of manufacture of the dissipator.

As so far described the units referred to are single units having a square base. However, one advantage of the present device and its method of manufacture is that it is well adapted for manufacture in multiple units, to carry either single or multiple semiconductor devices. This feature of the invention may be explained with reference to FIG. 16, which shows a strip of sheet metal 60 being fed in the direction of the arrow through suitable punch and die mechanism, not shown. The die may be a progressive die, and in any case it forms the louvres 62 and transverse slots 64 which define the wings, while the material is still flat. With the parts fabricated as shown, the strip may be severed between any desired units. If severed on the dotted lines 66, the resulting pieces are each three units long. By appropriately shifting the severance, the device may be made in any desired length. The bending of the wings relative to the base may be performed before or after severing the pieces, but the punching of the holes is preferably done last. This is so because in one case the user may want holes only at the middle unit of a three-unit piece to accommodate a power transistor, and in another case the user may want holes in each piece, the long unit being used as a common mounting for a series of semiconductor devices.

Figure 11:
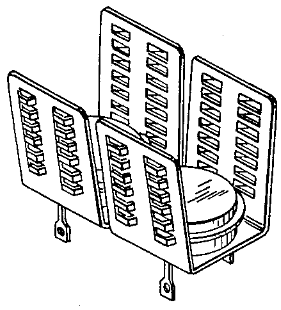
FIG. 11 shows a single heat dissipator which is two units in length.
Figure 13:
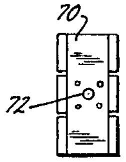
FIG. 13 is a small schematic plan view of a heat dissipator which is three units long, used for a single power transistor.
Figure 15:
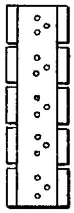
FIG. 15 shows a dissipator which is five units long used for five transistors.
Figure 14:
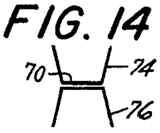
FIG. 14 is a small schematic end view showing two of the dissipators of FIG. 13 arranged back to back.

Referring to FIG. 11, the heat dissipator there shown is two units long and carries two transistors. Referring to FIG. 13, the dissipator 70 is three units long and has holes 72 at the center unit to receive a single semiconductor device, to provide increased heat dissipation. In FIG. 15 the dissipator is five units long and carries five transistors. FIG. 14 shows how long trough-like dissipators, such as those shown in FIGS. 11, 13 and 15, may be mounted back to back when desired. The dissipator 74 has its wings extending upward, and the dissipator 76 has its wings extending downward, the devices having their bases 70 in direct contact.

In transistors as commonly made, the metal case of the transistor is "hot" electrically; that is, it is not at ground potential. If the transistor is applied directly to the dissipator the latter is also made "hot," and then must be insulated from the remaining structure or chassis or circuitry. It is usually considered more convenient to keep the dissipator at ground potential, and it then is necessary to insulate the transistor from the dissipator. This is done by the interposition of a thin wafer of insulation beneath the transistor.

Figure 17:
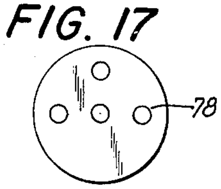
FIGS. 17 and 18 illustrate two of many shapes and size of insulation wafer which may be used between a semiconductor device and its heat dissipator.
Figure 18:
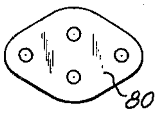

Such wafers are made in a variety of shapes and sizes, to fit all common semiconductor devices. By way of example, FIG. 17 shows a circular wafer 78, and FIG. 18 shows a diamond shaped wafer 80. The holes are suited for free passage of the terminals of the transistor.

Figure 12:
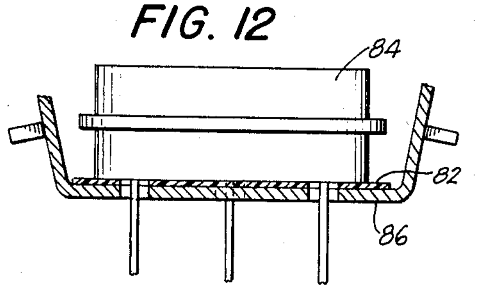
FIG. 12 is a fragmentary section showing the use of a thin insulation wafer between a semiconductor and its heat dissipator.

Referring now to FIG. 12, a wafer 82 is interposed between the casing of transistor 84 and the base 86 of the heat dissipator. The insulator may be made of mica or Teflon or a ceramic material, but in the latter case it is preferred to use beryllium oxide because that material is a good heat conductor. Many other materials would afford the desired electrical insulation, but would have the disadvantage of introducing undesirable heat insulation.

In respect to the holes shown in FIGS. 4, 13 and 15, it may be explained that a transistor has three leads, and a power transistor usually has a locating pin, which explains the presence of a fourth hole, and inasmuch as it may be desired to orient the transistor differently in different cases, the fifth hole may be provided. In such case the transistor may be mounted in any of four positions ninety degrees apart. However, a particular user desiring to insure a single orientation of a transistor would specify the holes and their orientation for his particular purpose.

As so far described, the base is flat, and the dissipator may be and is made in that fashion. However, in the particular case where it is known in advance that two units are to be mounted in nested and crossed relation, as shown in FIG. 8 and also at the bottom of FIG. 10, the dissipator is preferably given one further manufacturing step in a suitable die to bevel the four corners of the base, as shown at 90 in FIG. 1 and in some of the other figures. When this bevel is provided in nested units it prevents relative rotation about a vertical axis. The units are fixed rather closely in ninety degrees relation, whereas without the corner bevels, a slight amount of relative rotation is possible. This is so because the wings are slightly narrower than the base, by reason of the formation of the slots 64 shown in FIG. 16.

It is believed that the construction and method of use of my improved heat dissipator, as well as the advantages thereof, will be apparent from the foregoing detailed description. The heat dissipator is light in weight, it having only about one-third the weight of a conventional extruded heat sink, for the same amount of heat dissipation. It is inexpensive because it is stamped out of sheet material. It is compact in dimension, and may be used in a variety of ways. The modular method of manufacture makes it possible to use the same dies and punch press for most of the operations, while producing the device in a variety of lengths. The sheet metal used may be aluminum, which lends itself to anodizing, and that in turn has the advantage of being heat conducting and electrically insulating, which is particularly good for the present purpose.

It will also be apparent that while I have shown and described the invention in several preferred forms, changes may be made without departing from the scope of the invention, as sought to be defined in the following claims.

I claim:

1. A heat dissipator for use in electronic circuitry, said dissipator comprising two stamped sheet metal units each having a base and rectangular wings bent upward from opposite sides of the base, said bases having holes for passage of the terminals of a semiconductor, said wings being nearly perpendicular to the base but divergent at a small angle on each side, said bases being square and said wings being rectangular and having substantially the same width as the base, said two dissipator units being nested in crossed relation so that the assembly has four wings disposed about the four edges of a square base, the holes in the bases being in registration.

2. A heat dissipator for use in electronic circuitry, said dissipator comprising two stamped sheet metal units each having a base and rectangular wings bent upward from opposite sides of the base, said bases having holes for passage of the terminals of a semiconductor, said wings being nearly perpendicular to the base but divergent at a small angle on each side, said wings having narrow strips excised and displaced outwardly for increased heat dissipation, said sheet metal being aluminum which is anodized black, said bases being square and said wings being rectangular and having substantially the same width as the base, said two dissipator units being nested in crossed relation so that the assembly has four wings disposed about the four edges of a square base, the holes in the bases being in registration.

3. A heat dissipator for use in electronic circuitry, said dissipator comprising two stamped sheet metal units each having a base and rectangular wings bent upward from opposite sides of the base, said bases having holes for passage of the terminals of a semiconductor, said wings being nearly perpendicular to the base but divergent at a small angle on each side, said wings having narrow strips excised and displaced outwardly for increased heat dissipation, said bases being square and said wings being rectangular and having substantially the same width as the base, said two dissipator units being nested in crossed relation so that the assembly has four wings disposed about the four edges of a square base, the corners of the bases being beveled to improve the nesting of the dissipator units in crossed relation, the holes in the bases being in registration.

4. A heat dissipator for use in electronic circuitry, said dissipator comprising two stamped sheet metal units each having a base and rectangular wings bent upward from opposite sides of the base, said bases having holes for passage of the terminals of a semiconductor, said wings being nearly perpendicular to the base but divergent at a small angle on each side said wings having narrow strips excised and displaced outwardly for increased heat dissipation, said sheet metal being aluminum which is anodized black, the said two dissipator units being disposed back-to-back with the wings extending in opposite direction, the holes in the bases being in registration.

5. A heat dissipator for use in electronic circuitry, said dissipator comprising a stamped sheet metal unit having a base and rectangular wings bent upward from opposite sides of the base, said base having holes for passage of the terminals of a semiconductor, said wings being nearly perpendicular to the base but divergent at a small angle on each side, said base being rectangular and having a length which is an integral multiple of its width, and said wings being slotted transversely of the longitudinal axis of the base to provide a number of rectangular wings disposed edge-to-edge in a common plane along each edge of the base, each wing having a width substantially equal to the width of the base, and the number of wings at each side corresponding to the number of times the base is longer than wide.

6. A heat dissipator for use in electronic circuitry, said dissipator comprising a stamped sheet metal unit having a base and rectangular wings bent upward from opposite sides of the base, said base having holes for passage of the terminals of a semiconductor, said wings being nearly perpendicular to the base but divergent at a small angle on each side, said wings having narrow strips excised and displaced outwardly for increased heat dissipation, said sheet metal being aluminum which is anodized black, said base being rectangular and having a length which is an integral multiple of its width, and said wings being slotted transversely of the longitudinal axis of the base to provide a number of rectangular wings disposed edge-to-edge in a common plane along each edge of the base, each wing having a width substantially equal to the width of the base, and the number of wings at each side corresponding to the number of times the base is longer than wide.

References Cited by the Examiner

UNITED STATES PATENTS

| | | | |
|---|---|---|---|
| 2,680,009 | 6/54 | Nekut | 165—47 X |
| 2,888,228 | 5/59 | Jarvis | 174—35.5 X |
| 2,965,819 | 12/60 | Rosenbaum. | |

FOREIGN PATENTS

| | | |
|---|---|---|
| 219,887 | 6/59 | Australia. |
| 768,103 | 2/57 | Great Britain. |

CHARLES SUKALO, *Primary Examiner.*